United States Patent [19]
Furomoto et al.

[11] Patent Number: 5,772,138
[45] Date of Patent: *Jun. 30, 1998

[54] SPINNING REEL HAVING BALANCING MEANS

[75] Inventors: Yoshiyuki Furomoto, Osaka; Osamu Yoshikawa; Kenichi Sugawara, both of Sakai, all of Japan

[73] Assignee: Shimano, Inc., Osaka, Japan

[*] Notice: The portion of the term of this patent subsequent to May 28, 2012, has been disclaimed.

[21] Appl. No.: 631,628

[22] Filed: Apr. 8, 1996

Related U.S. Application Data

[60] Continuation of Ser. No. 279,429, Jul. 25, 1994, abandoned, which is a division of Ser. No. 889,273, May 28, 1992, Pat. No. 5,350,129.

[30] Foreign Application Priority Data

May 31, 1991 [JP] Japan ....................................... 3-40086
Nov. 19, 1991 [JP] Japan ....................................... 3-94724

[51] Int. Cl.$^6$ .................................................... A01K 89/01
[52] U.S. Cl. ............................................................. 242/231
[58] Field of Search .................................... 242/230, 231, 242/232, 233

[56] References Cited

U.S. PATENT DOCUMENTS

| | | | |
|---|---|---|---|
| 4,171,108 | 10/1979 | Ishida et al. | 242/231 |
| 4,202,508 | 5/1980 | Ishida et al. | 242/231 |
| 4,279,387 | 7/1981 | Morimoto . | |
| 4,427,162 | 1/1984 | Noda . | |
| 4,527,752 | 7/1985 | Maruyama et al. . | |
| 4,577,807 | 3/1986 | Urso | 242/230 |
| 5,350,129 | 9/1994 | Furomoto et al. | 242/231 |

FOREIGN PATENT DOCUMENTS

52-80887  6/1977  Japan .

Primary Examiner—Katherine Matecki
Attorney, Agent, or Firm—Jeffer, Mangels, Butler & Marmaro LLP

[57] ABSTRACT

A spinning reel includes a reel body, a rotor disposed at a forward position of the reel body, an arm cam pivotably attached to one of a pair of arm portions of the rotor and a pivotable arm pivotably attached to the other arm portion. A bail is interposed between a line roller of the arm cam and the pivotable arm. A balancer, which is provided to the pivotable arm, has a configuration projection on a side opposite to the bail and outwardly of the pivotable arm with respect to a direction along a pivot axis of the pivotable arm.

20 Claims, 8 Drawing Sheets

SPINNING REEL HAVING BALANCING MEANS

This application is a continuation of application Ser. No. 08/279,429 filed Jul. 25, 1994, now abandoned, which is a divisional of U.S. application Ser. No. 07/889,273 filed May 28, 1992 issued as U.S. Pat. No. 5,350,129.

BACKGROUND OF THE INVENTION

1. Field of the Invention

The present invention relates to a spinning reel having a balancing means and more particularly to art for improving rotational balance of a rotor of a spinning reel including an arm cam pivotably attached to one of a pair of arm portions of the rotor provided at a forward position of a reel body, a pivotable arm provided to the other arm portion and a bail extending between a line roller formed on the arm cam and the pivotable arm.

2. Description of the Related Art

In general, in the case of a spinning reel having the above-described construction, for retrieving a fishing line, the fishing line is guided via a line guide portion (generally comprised of a rotary member commonly referred to as a line roller) to be wound about a spool. Further, in the case of the conventional spinning reel of this type, there occurs an imbalance in rotation of the rotor due to the weights of such components as the arm cam, the line roller of the arm cam and so on. Then, in order to improve the rotational balance, a balancer is disposed e.g. inside the rotor at such a position as to offset the weights of the above components in a direction along a rotational axis of the rotor.

Figure 11:
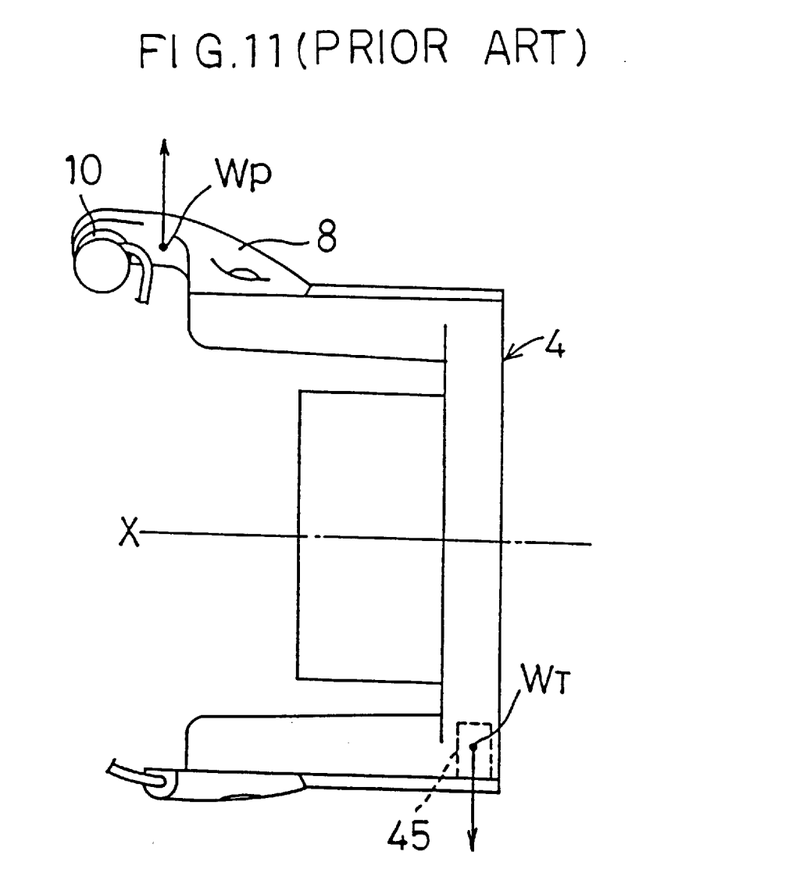
FIG. 11 is a side view showing a balancer arrangement of the prior art.

Now, considering the above arrangement where the balancer is disposed inside the rotor for instance, the arrangement is such that the weight balance is achieved in the direction along the rotational axis of the rotor. However, as shown in FIG. 11, with respect to a further direction normal to the rotational axis X of the rotor 4, a composite gravity center of the components including the arm cam 8, the line roller 10 and so on is located at a relatively forward position with respect to the rotor 4. As a result, there is produced a significant distance between a rotary path of the composite gravity center and a rotary path of a gravity center WT of the balancer 45. If a rotary operation is effected under this condition, there is produced a torque about a point where a straight line extending between the gravity centers WP and WT and the rotational axis X cross each other. Thus, in the case of a high-speed line retrieving operation, the rotor 4 will significantly vibrate and this vibration may be transmitted consequently to a top of a fishing rod, whereby the line retrieving operation can not be effected in a smooth manner.

In particular, in the case of spinning reels of recent years, the composite gravity center of the components including the arm cam tends to be located at a forwardly displaced position with respect to the rotor, since the line roller is provided with a large diameter in order to reduce load during a line retrieving action or the arm cam is provided with a mechanism for allowing one-step release operation of the bail. In such a case, the torque will have a larger value, thus a smooth line retrieving action even more difficult.

SUMMARY OF THE INVENTION

A primary object of the present invention is to provide an improved spinning reel which allows a smooth high-speed line retrieving action through an ingenious positioning arrangement of the balancer.

For accomplishing the above-noted object, a spinning reel, according to the present invention, comprises:

a reel body;

a rotor disposed at a forward position of the reel body;

an arm cam pivotably attached to one of a pair of arm portions of the rotor;

a pivotable arm pivotably attached to the other arm portion;

a bail interposed between a line roller of the arm cam and the pivotable arm; and a balancer provided to the pivotable arm, the balancer having a configuration projecting on a side opposite to the bail and outwardly of the pivotable arm with respect to a direction along a pivot axis of the pivotable arm.

Functions and effects of the above construction will be described next.

Figure 1:
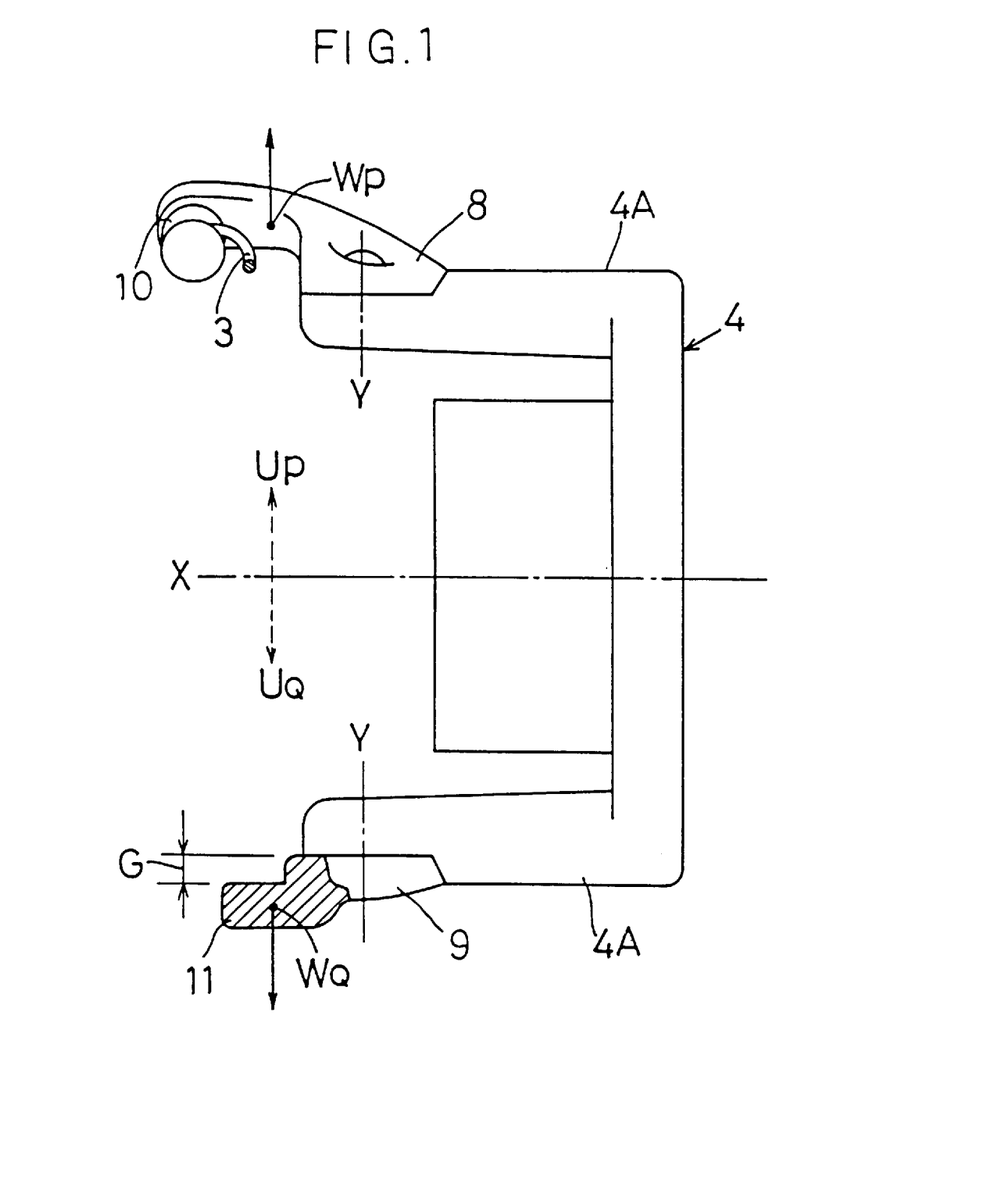
FIG. 1 is a schematic side view showing a balanced condition of a rotor of a spinning reel.
Figure 2:
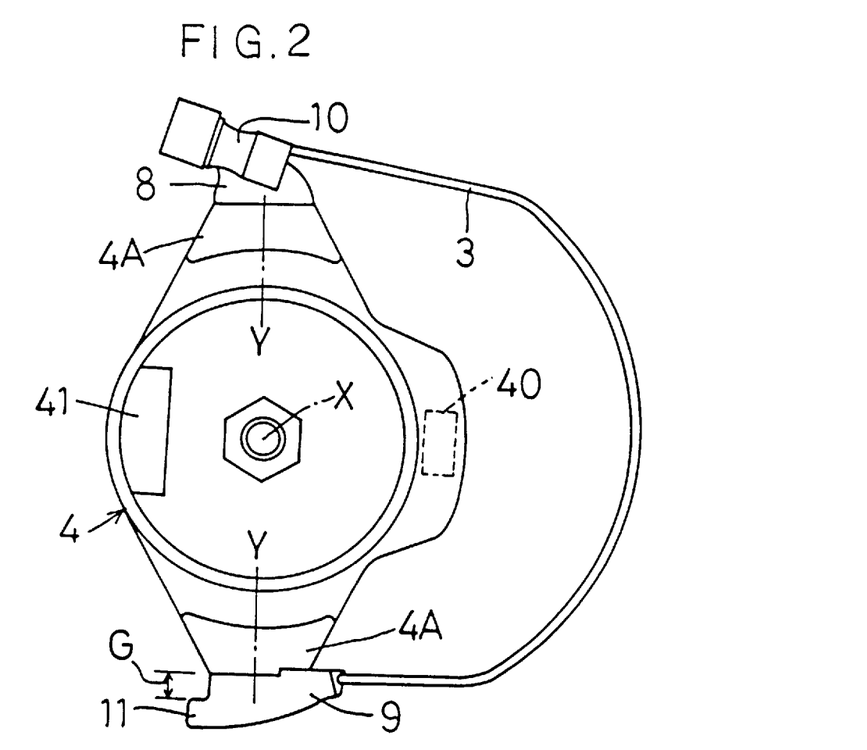
FIG. 2 is a front view of the rotor.
Figure 3:
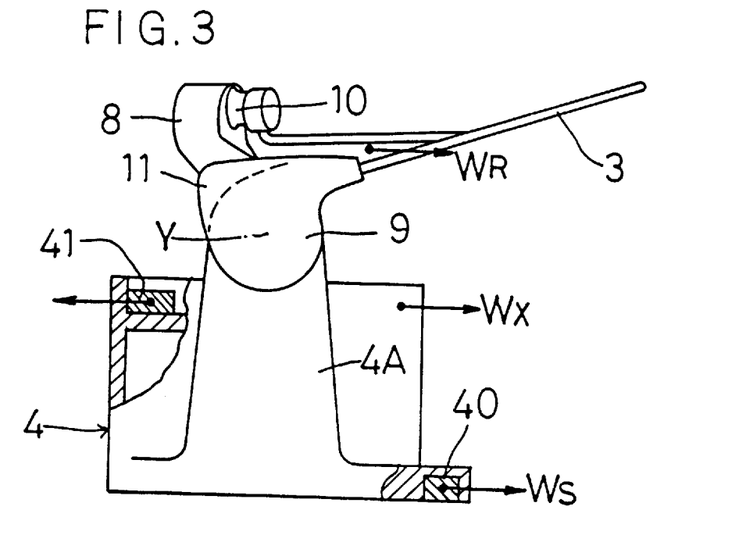
FIG. 3 is a side view of the rotor.

FIGS. 1 through 3 show a sample construction incorporating the above-described features of the invention. As shown, a composite gravity center WQ of the pivotable arm 9 and the balancer 11 and a gravity center WP of the arm cam 8 are located substantially on a same path. Moreover, these gravity centers WQ, WP are positioned to each other, so that moments of these gravity centers WQ, WP are balanced with each other. Also, since the composite gravity center WQ of the pivotable arm 9 and the balancer 11 is located in opposition to the bail 3 across the rotation axis X (i.e. a weight of this gravity center WQ can offset, to some extent, a weight of the bail 31, there is produced e.g. no torque from the weight of the arm cam 8 during rotation of the rotor 4.

Incidentally, FIG. 1 illustrates moment values of the above-described balanced condition with respect to the rotational axis X. As shown, a moment value UP from the weight of the composite gravity center WP of the arm cam and so on and a further moment value UQ from the weight of the composite gravity center WQ of the pivotable arm 9 and so on are balanced with each other.

In short, according to the present invention, the balancer 11 is formed with the pivotable arm 9. Thus, in comparison with the arrangement forming the balancer with the rotor 4 for instance, the balancer does not significantly project from the rotor 4, thus effectively restricting torque generation.

Consequently, through the ingenious arrangement of the balancer, the invention has fully achieved its intended object of providing an improved spinning reel which allows a smooth high-speed line retrieving action.

According to a further embodiment of the present invention, the spinning reel will be constructed to be described next.

According to this embodiment, like the foregoing construction, a spinning reel includes a bail pivotably interposed between a arm cam provided to one of a pair of arm portions of a rotor and pivotable arm provided to the other arm portion, wherein a balancer is formed with the pivotable arm and a composite gravity center of this balancer and of the pivotable arm is located as a position on or adjacent a rotational path along which the arm cam moves during rotation of the rotor with the composite gravity center being provided with such a weight as to offset a weight of a gravity center of the arm cam.

Functions and effects of this further construction will be described next.

Figure 7:
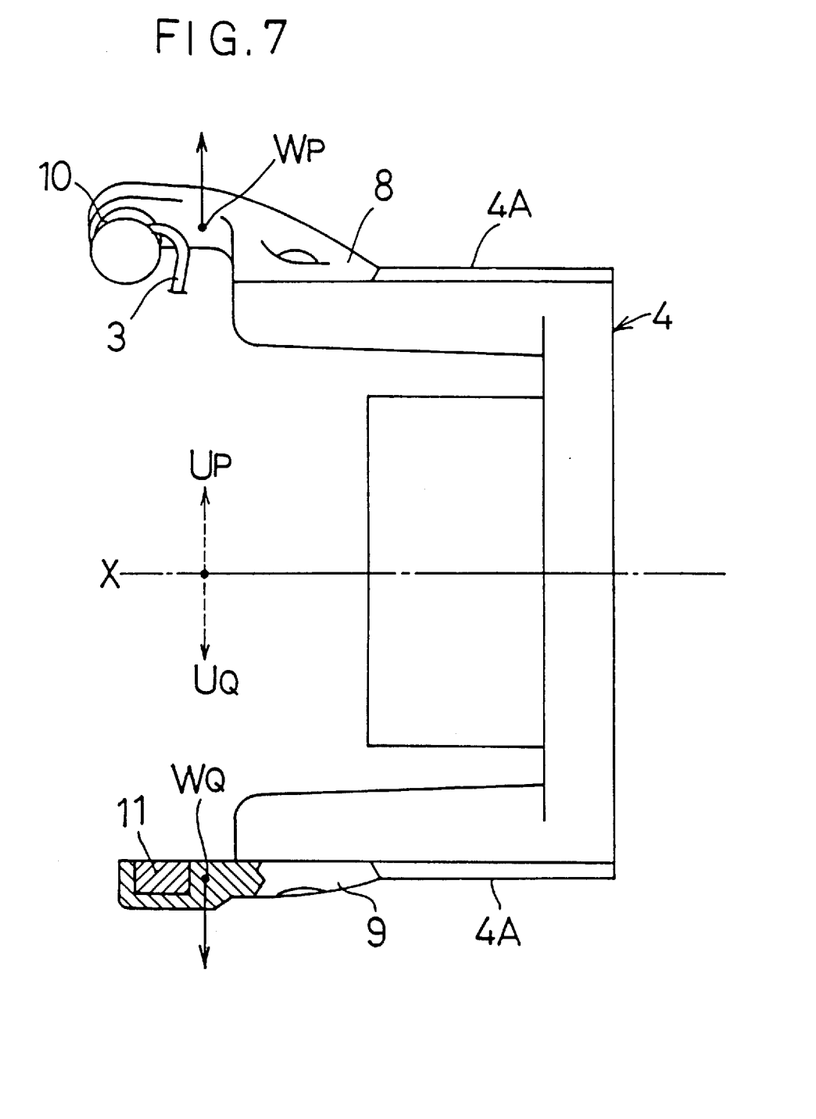
FIG. 7 is a side view showing an arrangement of a balancer of a spinning reel relating to a further embodiment of the present invention.
Figure 8:
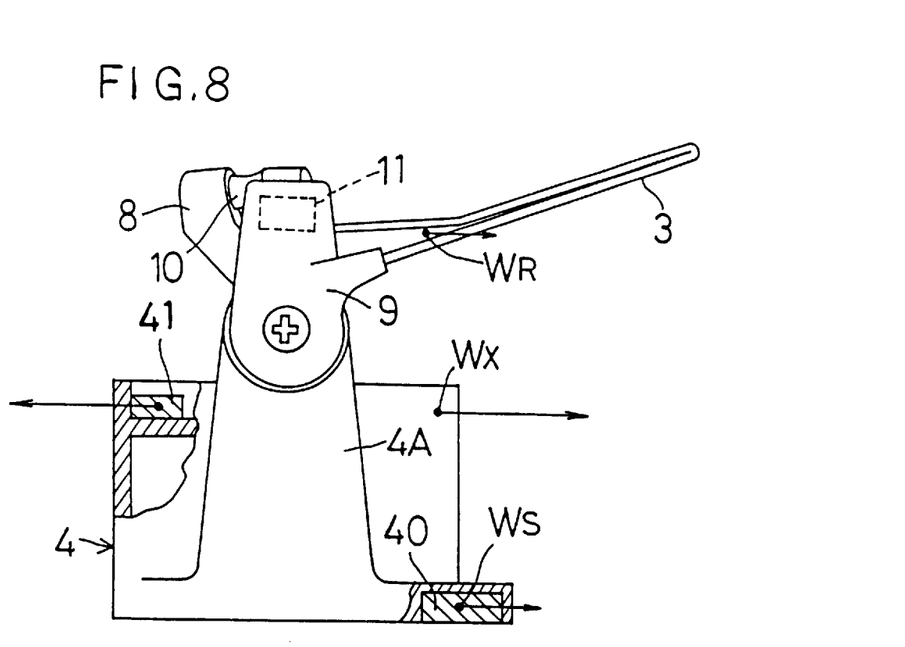
FIG. 8 is a side view of a rotor.
Figure 9:
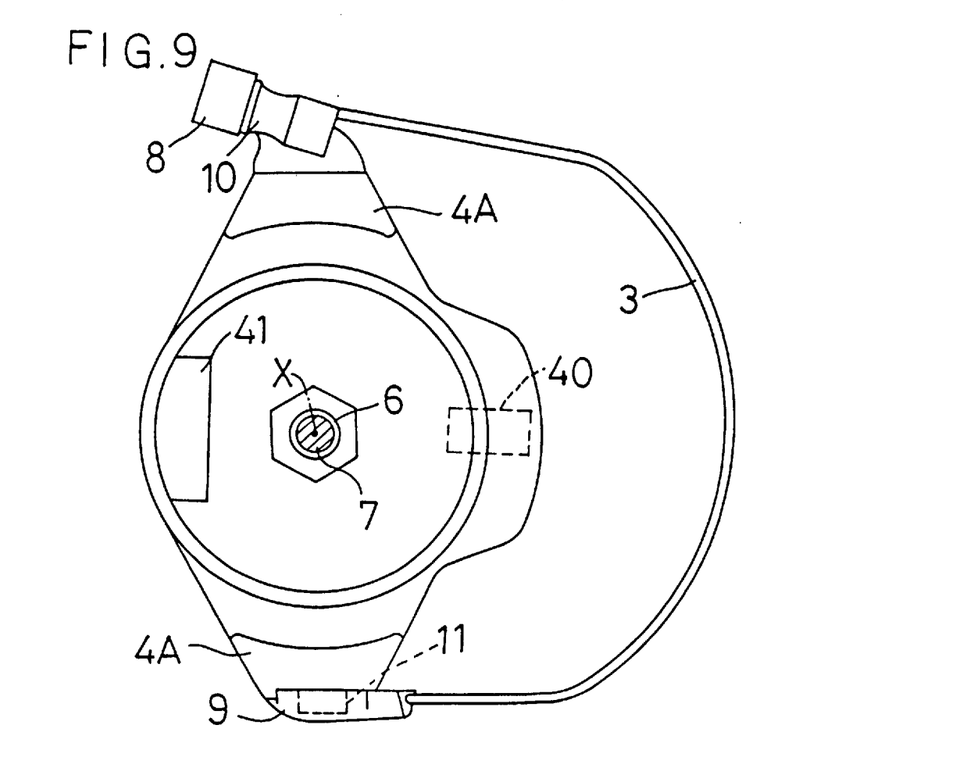
FIG. 9 is a front view of the rotor.
Figure 10:
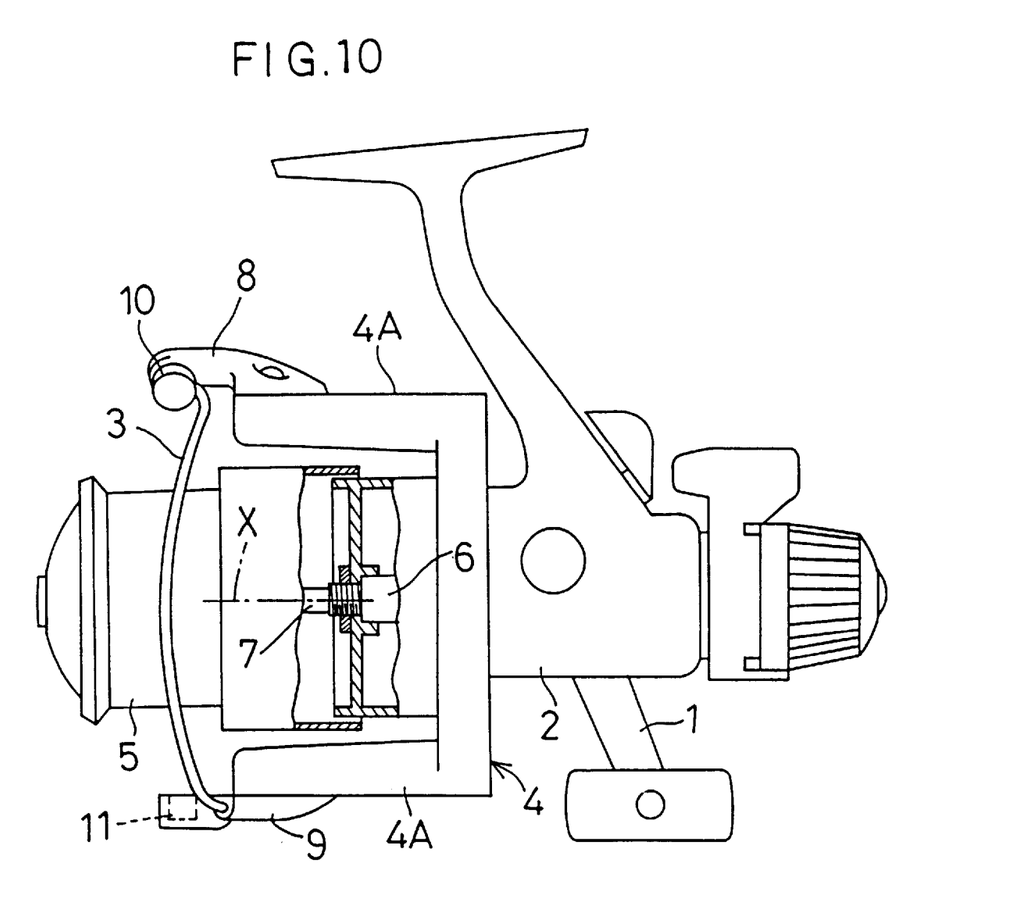
FIG. 10 is an overall side view of the spinning reel.

FIG. 7 shows a sample construction incorporating these features. As shown, the composite gravity center WQ of the pivotable arm 9 and of the balancer 11 and the gravity center WP of the arm cam 8 are located on the same path and also these gravity centers WQ, WP are opposed to each other. As a result, the weights balance each other in the direction along the axis X and also the gravity centers WQ, WP are located on the same rotational path, whereby there is produced e.g. no torque during the rotation of the rotor 4.

That is to say, according to these features of the present invention, the balancer 11 is formed integrally with or separately from the pivotable arm 9. Accordingly, in comparison with the arrangement of forming the balancer with the rotor 4, for instance, the balancer 11 does not project from the rotor 4 and there is produced no torque.

Consequently, through the ingenious arrangement of the balancer, the invention has also achieved an improved spinning reel which allows a smooth line retrieving action at a high speed without causing such inconvenience as vibration on the fishing rod even if a mechanical looseness is developed in the construction.

Further, and other objects, features and effects of the invention will become more apparent from the following more detailed description of the embodiments of the invention with reference to the accompanying drawings.

BRIEF DESCRIPTION OF THE DRAWINGS

Accompanying drawings illustrate preferred embodiments of a spinning reel relating to the present invention; in which.

DESCRIPTION OF THE PREFERRED EMBODIMENTS

Preferred embodiments of a spinning reel according to the present invention will now be described in details with reference to the accompanying drawings.

Figure 4:
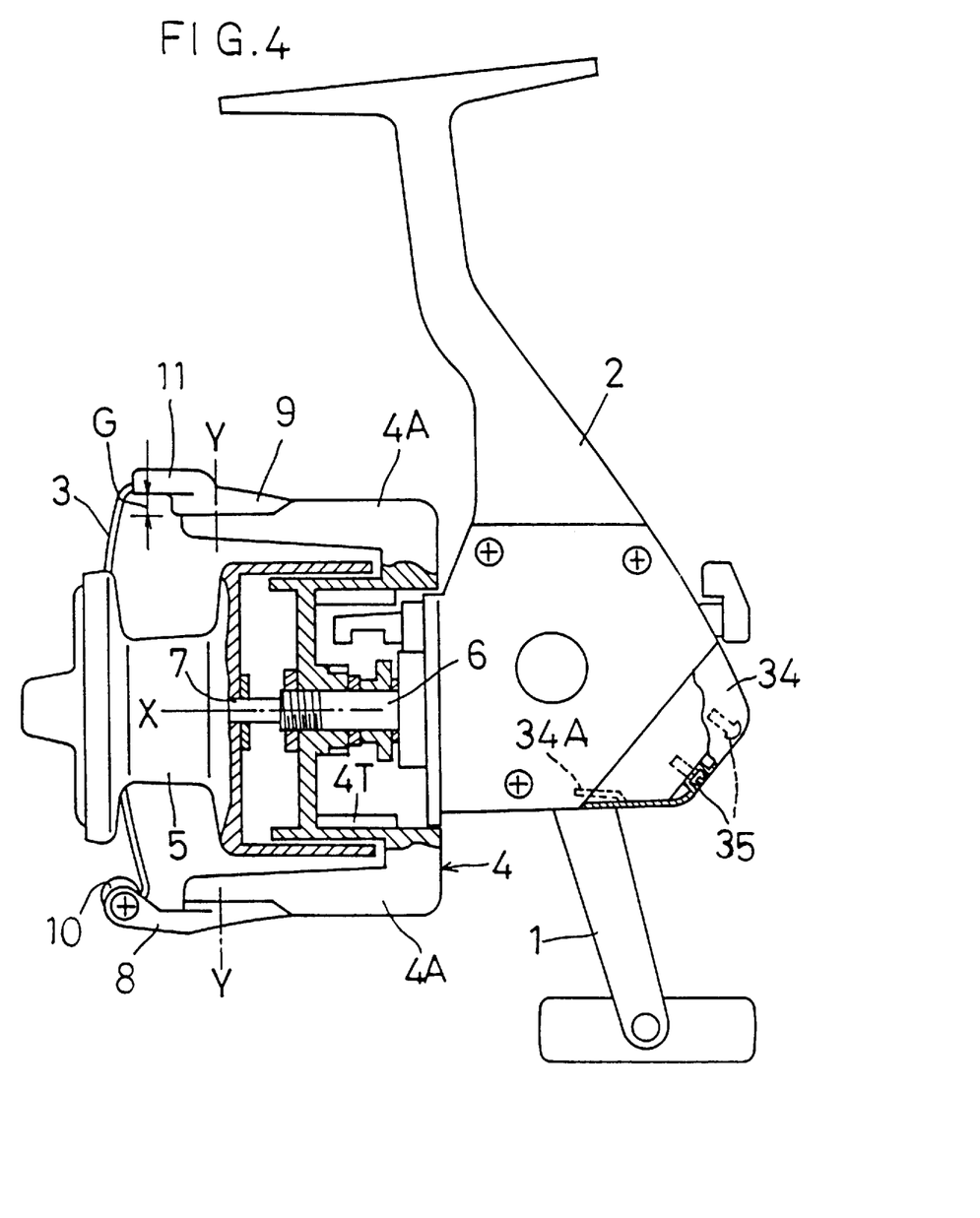
FIG. 4 is a partially cutaway side view of the reel.

FIG. 4 shows a spinning reel relating to a first embodiment of the invention. At forward positions of a reel body 2 having handle 1, there are disposed a rotor 4 having a bail and a spool 5 for retrieving a fishing line. At further forward positions of the reel body 2, there are provided a cylinder shaft 6 for transmitting a force from the handle 1 to the rotor 4 and a spool shaft 7 for supporting the spool 5.

Figure 5:
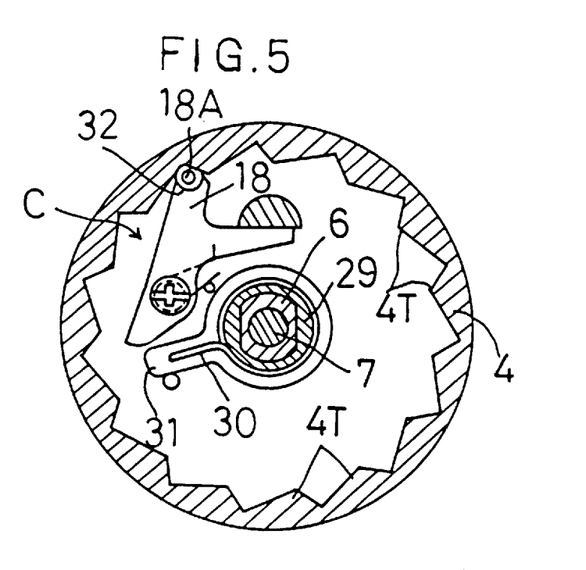
FIG. 5 is a front view of a one-way clutch mechanism.
Figure 6:
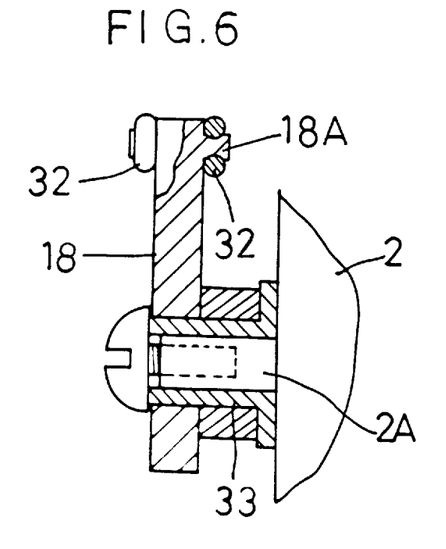
FIG. 6 is a section view of a support construction of a pawl member.

Further, in this reel, as shown in FIGS. 5 and 6, there is provided, inside the rotor 4, a one-way clutch C for preventing reverse rotation (rotation in a line-feeding direction) of the rotor 4. This one-way clutch C includes a plurality of teeth 4T formed on an inner periphery of the rotor 4, a pawl member 18 engageable with and disengageable from the teeth 4T and a cam member 31 operable by a spring member 30 outwardly engaging a sleeve 29 rotatable in unison with the cylinder shaft 6 in order to control a posture of the pawl member 18. On a shaft portion 18A formed at a leading end of the pawl member 18. There is provided an O-ring 32 for reducing impact noise which is generated with the engagement between the member 18 and the teeth 4T.

The pawl member 18 is supported to a projecting shaft portion 2A of the reel body 2 via a bush 33 made of a resin material.

Further, as shown in FIG. 4, at a rear portion of the reel body, there is provided a guard member 34 made of stainless steel with a forward end portion 34A of the member 34 being engaged with the reel body 2 while a rear face thereof being fastened by means of a screw 35, so that the guard member 34 can reduce frictional wear at this portion of the reel body.

The rotor 4 includes a pair of arm portions 4A, 4A at positions opposed to each other across a rotational axis X. An arm cam 8 is attached to one arm portion 4A to be pivotable about a pivot axis Y. A pivotable arm 9 is attached to the other arm portable 4A to be pivotable about the pivot axis Y. Further, the bail 3 is attached between a line roller 10 acting as a line guide unit provided with the arm cam 8 and the pivotable arm 9, with the bail 3 being switchable between a line releasing position and a line retrieving position.

Moreover, in this reel, there is provided a balancing means for offsetting imbalance from weights of such components as the arm cam 8 and the line roller 10.

More specifically, as shown in FIGS. 1 through 3, the pivotable arm 9 is provided as a heavy component as being formed of die-cast zinc; and a balancer 11 is formed integrally with the pivotable arm 9. The balancer 11 is so located as to project on a side opposite to the bail and outwardly of the pivotable arm 9 with respect to a direction along the axis Y. Further, a gap G is formed for displacing this balancer 11 outwardly in the direction of the axis Y.

The above-described formation of the gap G is for preventing contact between the balancer 11 and the arm portions 4A of the rotor 4 during an operation of the bail 3.

Further, a composite gravity center WQ of the balancer 11 and the pivotable arm 9 is arranged at a position on a rotational path along which a gravity center WP of the arm cam 9 moves during rotation of the rotor 4 and in opposition to said gravity center WP of the arm cam 8. Moreover, the composite gravity center WQ is provided with such a weight as to offset a weight of the arm cam 8. As a result, moments of the gravity centers WP, WQ are balanced with each other. With the moments from the weights of the gravity centers WP, WQ being offset each other, there is produced no vibration even if the rotor 4 is rotated at a high speed, whereby a smooth line retrieving action is possible.

Incidentally, with the above-described reel, while the balancer 11 can offset the weight of the bail 3 to some extent, the balancer 11 can not completely offset this weight. For this reason, in addition to the balancer 11, a further balancing means is provided for solving imbalance due to the weight of the bail 3. Referring more particularly to this further balancing means, a main balancer 41 is provided at a position opposed across the axis X to a composite gravity center WX composed of a gravity center WS of an auxiliary balancer 40 located with displacement relative to the reel body 2 on the side of the retrieving position of the bail 3 with respect to the direction along the axis X and of a further gravity center WR due to the weight of the bail 3; and the main balancer 41 has such a weight as to offset the weight of the composite gravity center WX during the rotation of the rotor 4.

Further, embodiments of the invention will be described next.

In addition to the foregoing embodiment, it is also conceivable to form the balancer 11 and the pivotable arm 9 as separate components, with the balancer 11 being attached to an outer side of this pivotable arm 9. Also, the balancer can be rendered position-adjustable.

In the foregoing embodiment, the balancers 40, 41 are provided for correcting the imbalance due to the weight of the bail 3. An alternate construction is possible to be described next. That is, the pair of arm portions 4A, 4A will be provided to the rotor 4 with the arm portions 4A, 4A being offset towards the side opposite to the bail. Then, without using the balancers, it is possible to balance with each other the moment from the weight of the pair of arm portions 4A, 4A and from the weight of the balancer 11 with the further moment due to the weight of the bail 3.

A still further embodiment will be described next.

In the case of a reel of this further embodiment, as shown in FIGS. 7 through 10, the balancer 11 is accommodated within the pivotable arm 9. Further, the composite gravity center WQ of the balancer 11 and of the pivotable arm 9 is located at the position on the rotational path along which the gravity center WP moves during rotation of the rotor 4 and in opposition to the gravity center WP of the arm cam 8; and the composite gravity center WQ is provided with such a weight as to offset the weight of the gravity center WP of the arm cam 8.

Through the above-described arrangement of the balancer 11, the weights are balanced with each other in the direction along the axis X. Further, the weights of the respective gravity centers WP, WQ are offset with each other. Accordingly, even if a mechanical looseness is developed in the support construction for the rotor 4, a smooth line retrieving action is possible without causing vibration during the rotation of the rotor 4.

Incidentally, in the case of there reel of this embodiment, in addition to the balancer 11, a further balancing means is provided for solving imbalance due to the weight of the bail 3. Referring more particularly to this further balancing means, the main balancer 41 is provided at the position opposed across the axis X to the composite gravity center WX composed of the gravity center WS of the auxiliary balancer 40 located with displacement relative to the reel body 2 on the side of the retrieving position of the bail 3 with respect to the direction along the axis X and of the further gravity center WR due to the weight of the bail 3; and the main balancer 41 has such weight as to offset the weight of the composite gravity center WX during the rotation of the rotor 4.

In addition to the above-described embodiments, it is also conceivable to form the balancer 11 and the pivotable arm 9 integrally with each other, with forming the pivotable arm 9 of a heavy material. Further, the balancer 11 can be attached to an outer side of the pivotable arm 9. Also, the balancer 11 can be rendered position-adjustable.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A spinning reel comprising:
   a reel body;
   a handle supported on said reel body;
   a rotor supported forwardly of said reel body, said rotor being rotatable about an axis by a driving force from said handle, and said rotor including:
   a pair of arm portions extending along said axis, said arm portions being substantially on opposite sides of said axis;
   an arm cam pivotably provided on one of said arm portions, said arm cam including a line roller, said arm cam having a center of gravity;
   a pivotable arm pivotably provided on the other of said arm portions, said pivotable arm having a center of gravity;
   a bail provided between said arm cam and said pivotable arm, said bail being pivotable with said arm cam and said pivotable arm between a line winding position and a line releasing position;
   a balance weight provided on the pivotable arm to form a composite center of gravity of said pivotable arm and said balance weight, said composite center of gravity being located at a position substantially diametrically opposed from said center of gravity of said arm cam with respect to the rotor axis.

2. A spinning reel of claim 1 wherein said composite center of gravity of said pivotable arm and said balance weight is substantially in position to the center of gravity of said arm cam along an axial direction of the same axis.

3. A spinning reel of claim 1 characterized in that said balance weight is integrally formed on said pivotable arm.

4. A spinning reel of claim 1, wherein said composite center of gravity is nearer to a tip end of said pivotable arm than said center of gravity of said pivotable arm along the axial direction of said rotor axis.

5. A spinning reel comprising:
   a reel body;
   a handle supported on said reel body;
   a rotor supported forwardly of said reel body, said rotor being rotatable about an axis by a driving force from said handle, and said rotor including:
   a first arm portion and a second arm portion both extending along said axis, said first and second arm portions being substantially on opposite sides of said axis;
   an arm cam pivotably provided on said first arm portion, said arm cam including a line roller, said arm cam having a center of gravity;
   a pivotable arm pivotably provided on said second arm portion, said pivotable arm having a center of gravity;
   a bail provided between said arm cam and said pivotable arm, said bail being pivotable with said arm cam and said pivotable arm between a line winding position and a line releasing position;
   a balance weight provided on the pivotable arm to form a composite center of gravity of said pivotable arm and said balance weight, said composite center of gravity being located at a position substantially opposite from said center of gravity of said arm cam with respect to the rotor axis.

6. A spinning reel of claim 5 wherein the center of gravity of the second arm portion with said pivotable arm substantially coincides with a position opposite to the center of gravity with said arm cam with respect to said axis when said bail is in said line winding position.

7. A spinning reel of claim 5 characterized in that said balance weight is integrally formed on said pivotable arm.

8. A spinning reel of claim 5, wherein said composite center of gravity is nearer to a tip end of said pivotable arm than said center of gravity of said pivotable arm along the axial direction of said rotor axis.

9. A spinning reel comprising:

a reel body;

a handle supported on said reel body;

a rotor supported forwardly of said reel body, said rotor being rotatable about an axis by a driving force from said handle, and said rotor including:

a pair of arm portions extending along said axis, said arm portions being substantially on opposite sides of said axis;

an arm cam pivotably provided on one of said arm portions, said arm cam including a line roller;

a pivotable arm pivotably provided on the other of said arm portions;

a bail provided between said arm cam and said pivotable arm, said bail being pivotable with said arm cam and said pivotable arm between a line winding position and a line releasing position;

a balance weight portion provided on said pivotable arm so as to extend substantially forwardly of said reel from said pivotable arm so that said pivotable arm and said arm cam dynamically substantially balance with each other when said bail is in said line winding position, a forward end of said balance weight portion being substantially flush with a forward end of said arm cam along the direction of said axis.

10. A spinning reel comprising:

a reel body;

a handle supported on said reel body;

a rotor supported forwardly of said reel body, said rotor being rotatable about an axis by a driving force from said handle, and said rotor including:

a first arm portion and a second arm portion both extending along said axis, said first and second arm portions being substantially on opposite sides of said axis;

an arm cam pivotably provided on said first arm portion, said arm cam including a line roller;

a pivotable arm pivotably provided on said second arm portion;

a balance weight portion provided on said pivotable arm so as to extend substantially forwardly of said reel from said pivotable arm so that the second arm portion with said pivotable arm and the first arm portion with said arm cam dynamically substantially balance with each other when said bail is in said line winding position, a forward end of said balance weight being substantially flush with a forward end of said arm cam along the direction of said axis.

11. A spinning reel comprising:

a reel body;

a handle supported on said reel body;

a rotor supported forwardly of said reel body, said rotor being rotatable about an axis by a driving force from said handle, and said rotor including:

a pair of arm portions extending forwardly along said axis, said arm portions being substantially on opposite sides of said axis;

an arm cam pivotally provided on a forward most portion of one of said arm portions, said arm cam including a line roller, said arm cam having a center of gravity;

a pivotable arm pivotably provided on a forward most portion of the other of said arm portions, said pivotable arm having a center of gravity;

a bail provided between said arm cam and said pivotable arm, said bail being pivotable with said arm cam and said pivotable arm between a line winding position and a line releasing position; and a balance weight provided on the pivotable arm to form a composite center of gravity of said pivotable arm and said balance weight, said balance weight being so positioned that said composite center of gravity is located within said pivotable arm.

12. A spinning reel comprising:

a reel body;

a rotor disposed at a forward position of the reel body;

a pair of arm portions extending from said rotor, disposed on said rotor substantially opposite to each other with respect to the axis of rotation of said rotor;

an arm cam pivotably attached to one of said pair of arm portions;

a line roller mounted on said arm cam;

a pivotable arm attached to the other said arm portions;

a bail interposed between said line roller and the pivotable arm;

said arm cam and said pivotable arm being pivotable about a pivot axis;

the pivotable arm including a balancer, said balancer being on a side of said pivot axis substantially opposite to the bail, said balancer being formed integrally with said pivotable arm.

13. A spinning reel comprising:

a reel body;

a handle supported on said reel body;

a rotor supported forwardly of said reel body, said rotor being rotatable about an axis by a driving force from said handle, and said rotor including:

a pair of arm portions extending forward along said axis, said arm portions being substantially on opposite sides of said axis;

an arm cam pivotally provided on a forward most portion of one of said arm portions, said arm cam including a line roller, said arm cam having a center of gravity;

a pivotable arm pivotably provided on a forward most portion of the other of said arm portions, said pivotable arm having a center of gravity;

a bail provided between said arm cam and said pivotable arm, said bail being pivotable with said arm cam and said pivotable arm between a line winding position and a line releasing position; and a balance weight provided within the pivotable arm.

14. A rotor for a spinning reel, said rotor having an axis of rotation, said rotor comprising:

a pair of arm portions extending along said axis, said arm portions being substantially on opposite sides of said axis;

an arm cam pivotably provided on one of said arm portions, said arm cam including a line roller, said arm cam having a center of gravity;

a pivotable arm pivotably provided on the other of said arm portions, said pivotable arm having a center of gravity;

a bail provided between said arm cam and said pivotable arm, said bail being pivotable with said arm cam and said pivotable arm between a line winding position and a line releasing position;

a balance weight provided on the pivotable arm to form a composite center of gravity of said pivotable arm and said balance weight, said composite center of gravity being located at a position substantially diametrically opposed from said center of gravity of said arm cam with respect to said axis.

15. A rotor of claim 14 wherein said composite center of gravity of said pivotable arm and said balance weight is substantially in position to the center of gravity of said arm cam along an axial direction of said axis.

16. A spinning reel of claim 14, wherein said composite center of gravity is nearer to a tip end of said pivotable arm than said center of gravity of said pivotable arm along the axial direction of said axis.

17. A rotor for a spinning reel, said rotor having an axis of rotation, said rotor comprising:

a first arm portion and a second arm portion both extending along said axis, said first and second arm portions being substantially on opposite sides of said axis;

an arm cam pivotably provided on said first arm portion, said arm cam including a line roller, said arm cam having a center of gravity;

a pivotable arm pivotably provided on said second arm portion, said pivotable arm having a center of gravity;

a bail provided between said arm cam and said pivotable arm, said bail being pivotable with said arm cam and said pivotable arm between a line winding position and a line releasing position;

a balance weight provided on the pivotable arm to form a composite center of gravity of said pivotable arm and said balance weight, said composite center of gravity being located at a position substantially opposite from said center of gravity of said arm cam with respect to said axis.

18. A rotor of claim 17 wherein said center of gravity of said second arm portion with said pivotable arm substantially coincides with a position opposite to the center of gravity with said arm cam with respect to said axis when said bail is in said line winding position.

19. A spinning reel of claim 17, wherein said composite center of gravity is nearer to a tip end of said pivotable arm than said center of gravity of said pivotable arm along the axial direction of said axis.

20. A rotor for a spinning reel, said rotor having an axis of rotation, said rotor comprising:

a first arm portion and a second arm portion both extending along said axis, said first and second arm portions being substantially on opposite sides of said axis;

an arm cam pivotably provided on said first arm portion, said arm cam including a line roller;

a pivotable arm pivotably provided on said second arm portion;

a balance weight portion provided on said pivotable arm so as to extend substantially forwardly of said reel from said pivotable arm so that the second arm portion with said pivotable arm and the first portion with said arm cam dynamically substantially balance with each other when said bail is in said line winding position, a forward end of said balance weight being substantially flush with a forward end of said arm cam along the direction of said axis.

* * * * *